(12) United States Patent
Limmer et al.

(10) Patent No.: US 7,072,147 B2
(45) Date of Patent: Jul. 4, 2006

(54) HARD DRIVE ACTUATOR ARM WITH REDUCED SKEW VARIATION

(75) Inventors: Joel David Limmer, Bloomington, MN (US); Zine-Eddine Boutaghou, Vadnais Height, MN (US); Wayne Allen Bonin, North Oaks, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 137 days.

(21) Appl. No.: 10/600,879

(22) Filed: Jun. 20, 2003

(65) Prior Publication Data

US 2004/0257710 A1    Dec. 23, 2004

(51) Int. Cl.
*G11B 5/55* (2006.01)

(52) U.S. Cl. ............................... 360/264.1; 360/265.6; 360/265.9; 360/266.1

(58) Field of Classification Search ... 360/264.1–266.1
See application file for complete search history.

(56) References Cited

U.S. PATENT DOCUMENTS

| 4,631,611 | A |   | 12/1986 | Schneider |
|---|---|---|---|---|
| 4,751,596 | A | * | 6/1988 | Rohart ..................... 360/256.3 |
| 4,902,971 | A |   | 2/1990 | Guzik et al. |
| 5,029,030 | A |   | 7/1991 | Luecke |

FOREIGN PATENT DOCUMENTS

JP            59-28216     *  2/1984

* cited by examiner

*Primary Examiner*—A. J. Heinz
(74) *Attorney, Agent, or Firm*—Kinney & Lange, P.A.

(57) ABSTRACT

A rotary actuator system includes an actuator block, a head mounting block, and a linkage arm connecting the actuator block and the head mounting block. The system further includes an actuator motor operatively connected to the actuator block for rotating a link. The linkage arm includes a drive link which is rotated by the actuator motor and a guide link spaced apart from the drive link. The drive link has a first end and a second end; the drive link is pivotally connected to the actuator block at the first end and connected to the head mounting block at the second end. The guide link has a first end and a second end; the guide link is connected to the actuator block at the first end and connected to the head mounting block at the second end.

24 Claims, 9 Drawing Sheets

HARD DRIVE ACTUATOR ARM WITH REDUCED SKEW VARIATION

CROSS REFERENCE TO RELATED APPLICATION

None.

BACKGROUND OF THE INVENTION

The present invention relates to an actuator arm and more particularly to a hard drive actuator arm with reduced skew variation.

In disc drive technology it is becoming increasingly important that the relative angle between the read/write or transducer head and the data tracks changes very little, if at all, as the head moves across the surface of the disc. The relative angle between the head and the tracks is also known as skew. Magnetic recording discs can now achieve very large track densities and even a small change in the head skew can interfere with proper reading and writing of data on the disc.

Currently, head actuators consist of three types: linear, rotary, and combinations of both. Linear actuators consist of a sliding arm to which the head is attached. The arm is aligned along a radius of the disc and the head moves along the radius as the arm slides in and out without any variation in the skew. The problem with linear actuators is that they require a number of roller bearings to hold the arm. These bearings add unwanted inertia and frictional force to the system. Moreover, the relatively large amount of mass at the end of the actuator arm greatly reduces its speed, and hence, increases the access time of the disc drive system.

Rotary actuators pivot about a point or roll about a surface. The advantage of a rotary actuator is that it is much lighter and faster than a linear actuator. The major problem with the rotary actuator is that the skew angle between the head and the data tracks can vary by as much as 10 to 15 degrees as the head moves across the disc. Optimizing the position of the head and the dimensions of the head arm can reduce the skew angle variance; however, the variance may still be too large for high density disc drive systems. Perpendicular recording promises significant increases in disc capacity. However, because of write head design, track density increases demand that skew is less than 2 degrees across the surface of the disc. Thus, rotary actuators that have heads that compensate for the skew angle variance have been developed. However, they typically require a relatively large number of additional parts which correspondingly slows the access time.

Thus, there remains a need for an actuator arm which allows for reduced skew variation and quick access times.

BRIEF SUMMARY OF THE INVENTION

A rotary actuator system of the present invention includes an actuator block, a head mounting block, and a linkage arm connecting the actuator block and the head mounting block. The system further includes an actuator motor operatively connected to the actuator block for rotating a link. The linkage arm includes a drive link which is rotated by the actuator motor and a guide link spaced apart from the drive link. The drive link has a first end and a second end; the drive link is pivotally connected to the actuator block at the first end and connected to the head mounting block at the second end. The guide link has a first end and a second end; the guide link is connected to the actuator block at the first end and connected to the head mounting block at the second end.

DETAILED DESCRIPTION

Figure 1:
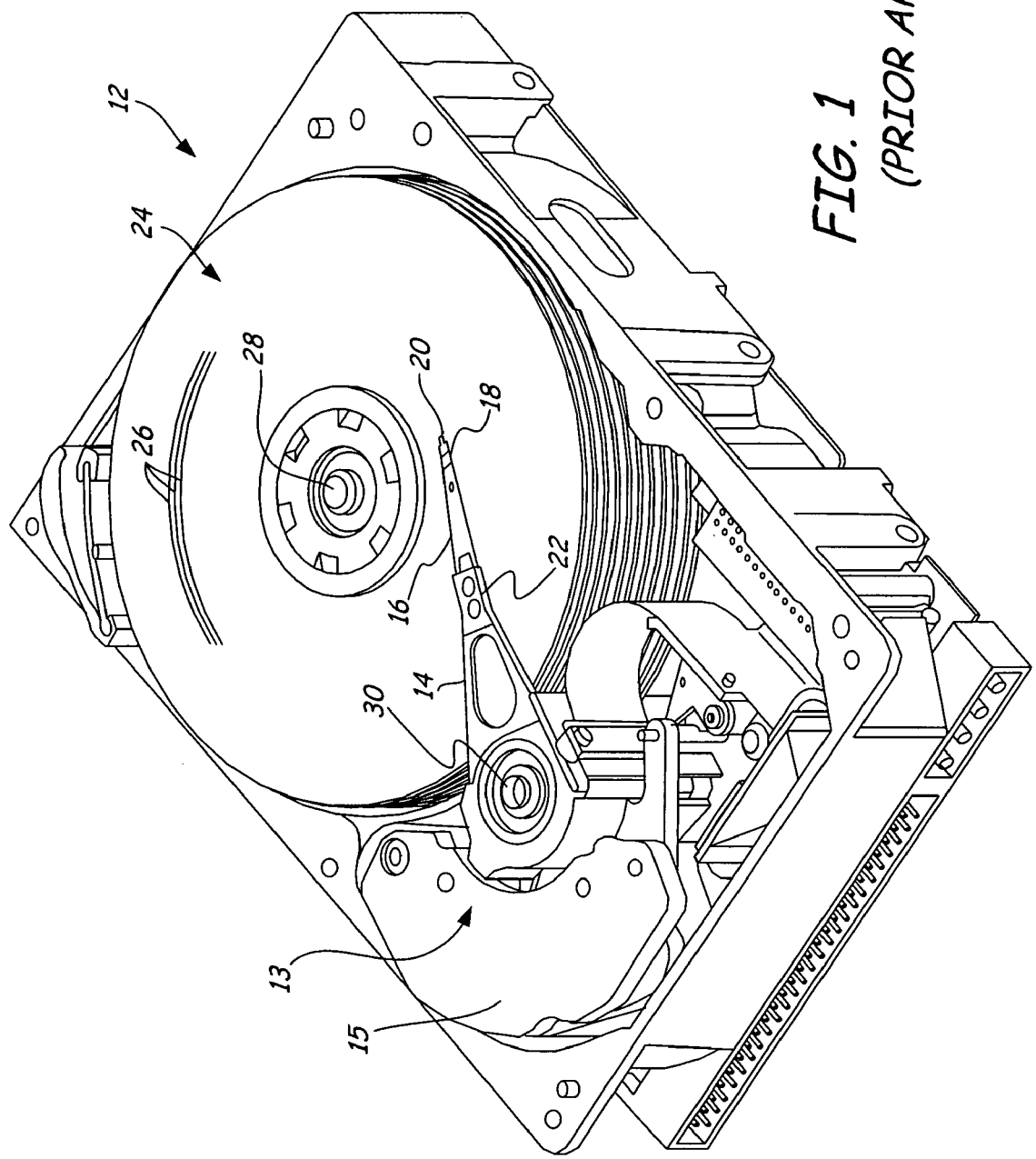
FIG. 1 shows a top perspective view of a disc drive.

FIG. 1 shows a top perspective view of a disc drive 12, which includes an actuator block 13, actuator arm 14, actuator motor 15, suspension 16, flexure 18, slider 20, head mounting block 22, and disc 24. Slider 20 is connected to the distal end of suspension 16 by flexure 18. Suspension 16 is connected to actuator arm 14 at head mounting block 22. Actuator arm 14 is coupled to actuator motor 15 within actuator block 13. Disc 24 has a multiplicity of tracks 26 and rotates about axis 28.

During operation of disc drive 12, rotation of disc 24 generates air movement which is encountered by slider 20. This air movement acts to keep slider 20 aloft a small distance above the surface of disc 24, allowing slider 20 to fly above the surface of disc 24. Actuator motor 15 within actuator block 13 is selectively operated to move actuator arm 14 around axis 30, thereby moving suspension 16 and positioning the transducing head (not shown) carried by slider 20 over tracks 26 of disc 24. Proper positioning of the transducing head is necessary for reading and writing data on concentric tracks 26 of disc 24.

Figure 2:
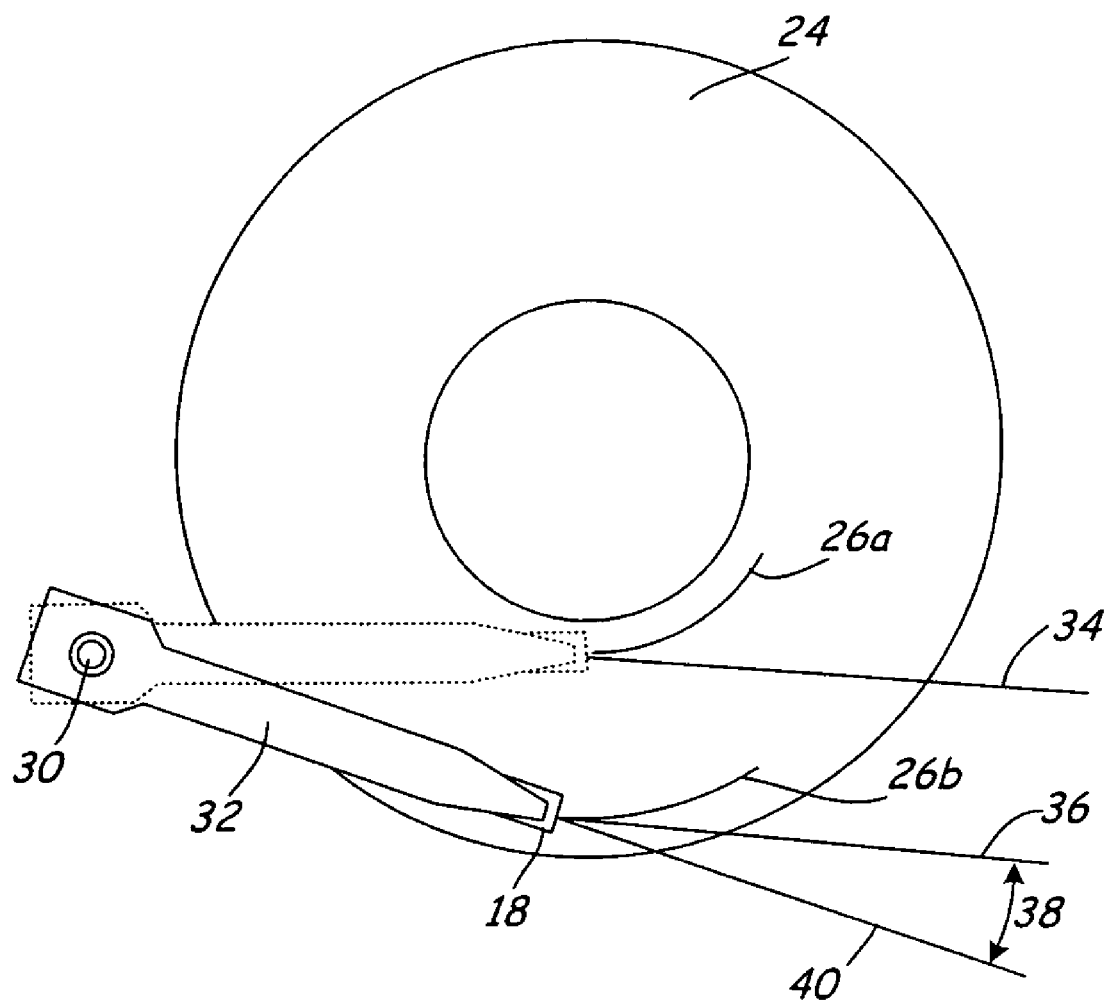
FIG. 2 is a top plan view illustrating skew with a conventional pivot arm.

FIG. 2 is a top plan view illustrating skew with a conventional pivot arm. For purposes of illustration, a conventional disc drive actuator arm has been simplified as an actuator arm 32 pivotally connected to the actuator (not shown) at axis 30, and having flexure 18 for holding a slider having a transducer for communicating with disc 24. FIG. 2 illustrates the sweep of arm 32 from an inner diameter of disc 24 at track 26a (shown in phantom) to an outer diameter of disc 24 at track 26b. Arm 32 is usually mounted so that when arm 32 is at inner track 26a, flexure 18 carries the slider so that the slider is angularly positioned in line with tangent 34 to track 26a. However, it can be seen that as arm 32 sweeps toward outer track 26b, the pivotal movement of arm 32 about axis 30 results in a skew of flexure 18 away from tangent 36 of outer track 26b. In the illustrated example, arm 32 has a 1.5 inch pivot-to-transducer distance (the distance from axis 30 to the transducer of slider 20 carried by flexure 18). In a conventional 65 millimeter (2.5 inch) diameter disc 24, the maximum sweep between inner track 26a and outer track 26b is about 0.75 inch. During that sweep, the skew angle 38 between a direction 40 of the slider and a tangent 36 to the track is about 13.7 degrees. In many conventional actuators, arm 32 is shorter than 1.5 inches. In those cases, skew angle 38 is even greater, and a skew change of over 20 degrees is not uncommon.

Figure 3:
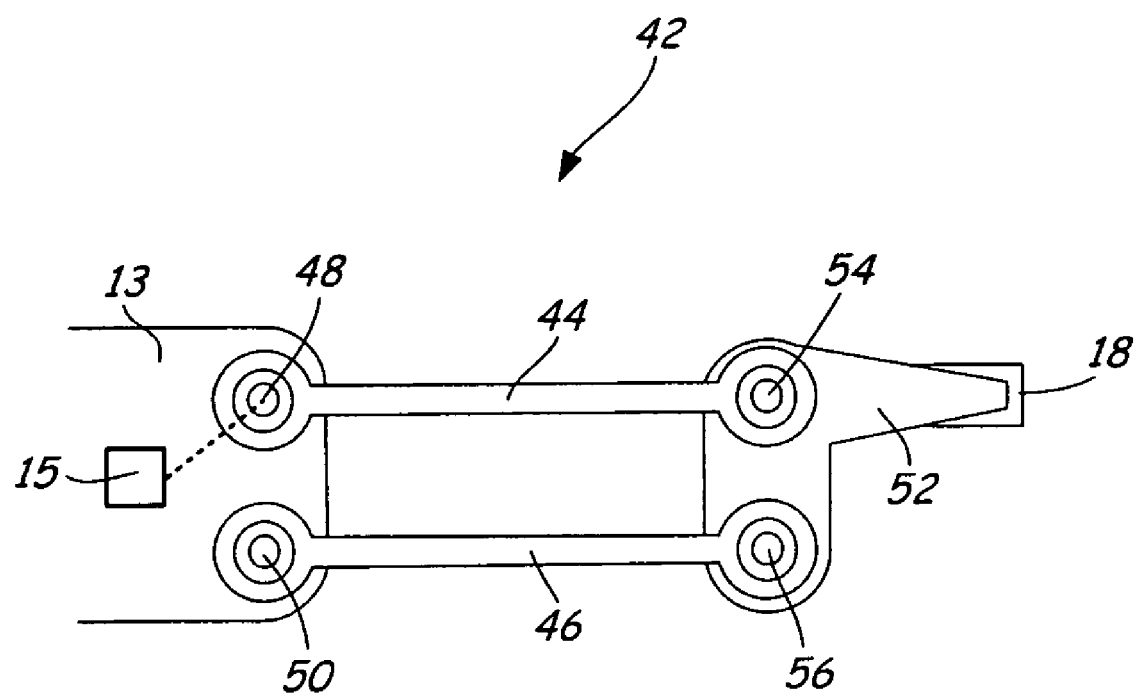
FIG. 3 is a top plan view of one embodiment of an actuator arm of the present invention.

FIG. 3 is a top plan view of one embodiment of an actuator arm of the present invention. The present invention introduces a novel construction for an actuator arm to reduce skew angle 38 upon rotational displacement of the arm by the actuator motor 15 within actuator block 13. Arm 42 includes links 44 and 46 which are pivotally connected to actuator block 13 at axis 48 and axis 50, respectively. In one embodiment, the actuator motor 15 within actuator block 13 controls the pivoting motion only at axis 48; link 46 is pivotally attached at axis 50, but is not powered by actuator motor 15. In such an embodiment, because the motion of link 44 is driven by actuator motor 15 at axis 48, link 44 is referred to as a drive link. One or more guide links is spaced apart from the drive link. Link 46, whether it is driven or not, is referred to as a guide link because it constrains and guides the orientation of head block 52, and thereby the transducer carried thereon, about axis 54. Links 44 and 46 are attached at their opposite ends to mounting block 52 at axes 54 and 56, respectively. Flexure 18 is attached to mounting block 52 for carrying slider 20. In the embodiment illustrated in FIG. 3, links 44 and 46 are parallel links of the same length. When arm 42 is rotated by actuator motor 15 about axes 48 and 50, links 44 and 46 will remain parallel. In one embodiment, the distance from axis 48 or axis 50 to axis 54 or axis 56, respectively, is 1 inch. The distance from axis 54 or axis 56, along the same line, to the transducer held by flexure 18 is 0.5 inch. Thus, the total length of arm 42 is 1.5 inch, the same as the length of conventional arm 32 of FIG. 2. The displacement distance between axis 48 and axis 50, and between axis 54 and axis 56, is 0.31 inch.

Figure 4:
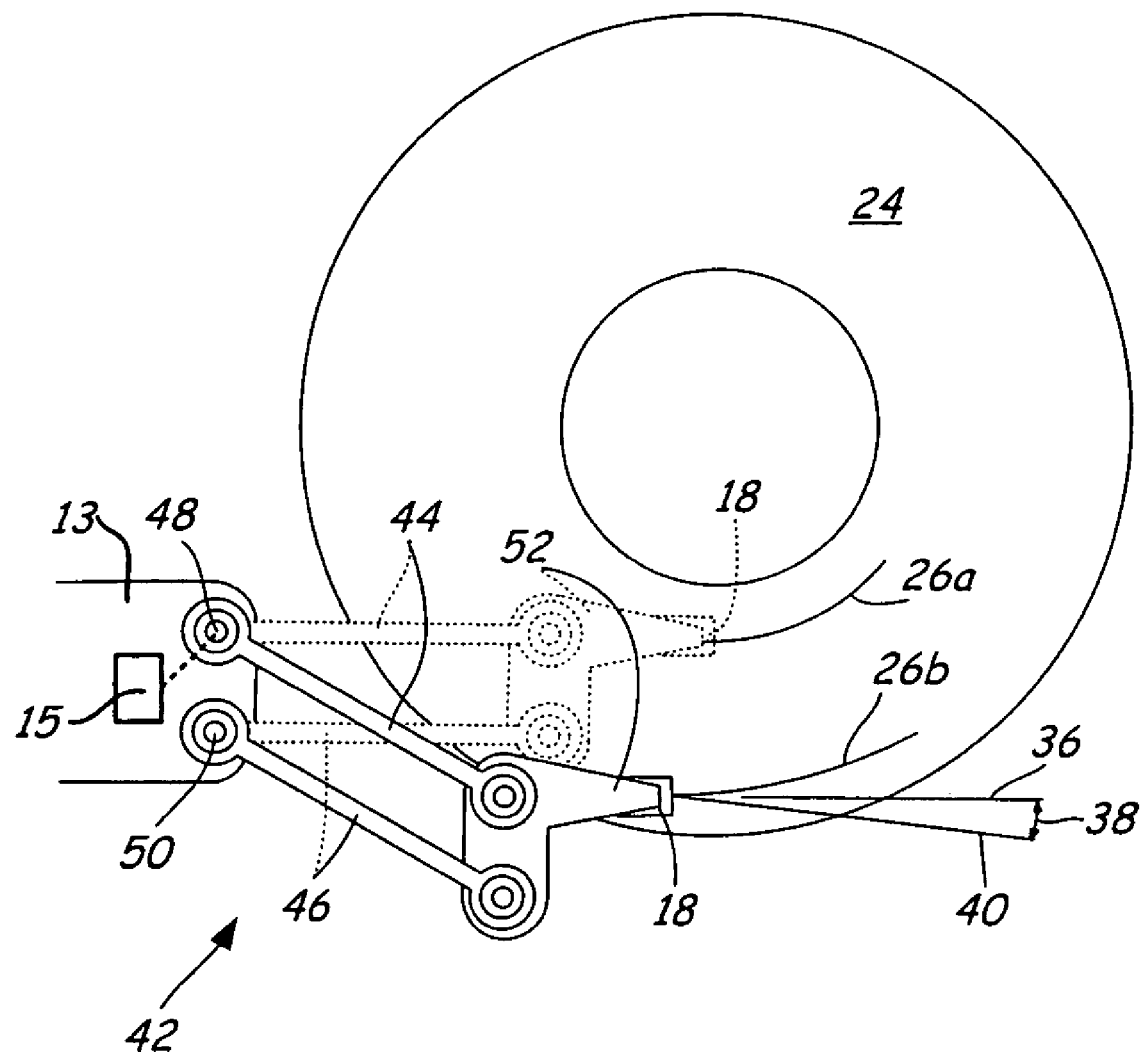
FIG. 4 is a top plan view illustrating the skew of the arm of FIG. 3 as it travels across a disc.

FIG. 4 is a top plan view illustrating the skew of the arm of FIG. 3 as it travels across disc 24. As arm 42 is translated by conventional actuator motor 15, the rotational motion of links 44 and 46 in a common plane translates into the displacement shown in FIG. 4 as flexure 18 moves from inner track 26a to outer track 26b. The parallel linkage construction of arm 42 holds the direction of flexure 18 nearly parallel to tangent 36 of outer track 26b so that direction 40 of the slider varies from tangent 36 by only about 6.3 degrees. Skew angle 38 can be varied as desired by changing dimensions and angles of arm 42 such as the length of links 44 and 46; the distance by which links 44 and 46 are separated; the length, shape and orientation of mounting block 52; and the angle and position of flexure 18 and slider 20, for example. Dimensions for a particular application and calculations for linkage designs with minimal skew variation can be determined using commercially available software programs. Because the translation of the transducer held by flexure 18 is not in a straight line along a radius of disc 24, skew angle 38 is not zero. However, it is less than about 7 degrees and significantly less than the skew angle 38 experienced with a conventional arm 32, as discussed above with reference to FIG. 2, for the same total arm length.

Figure 5:
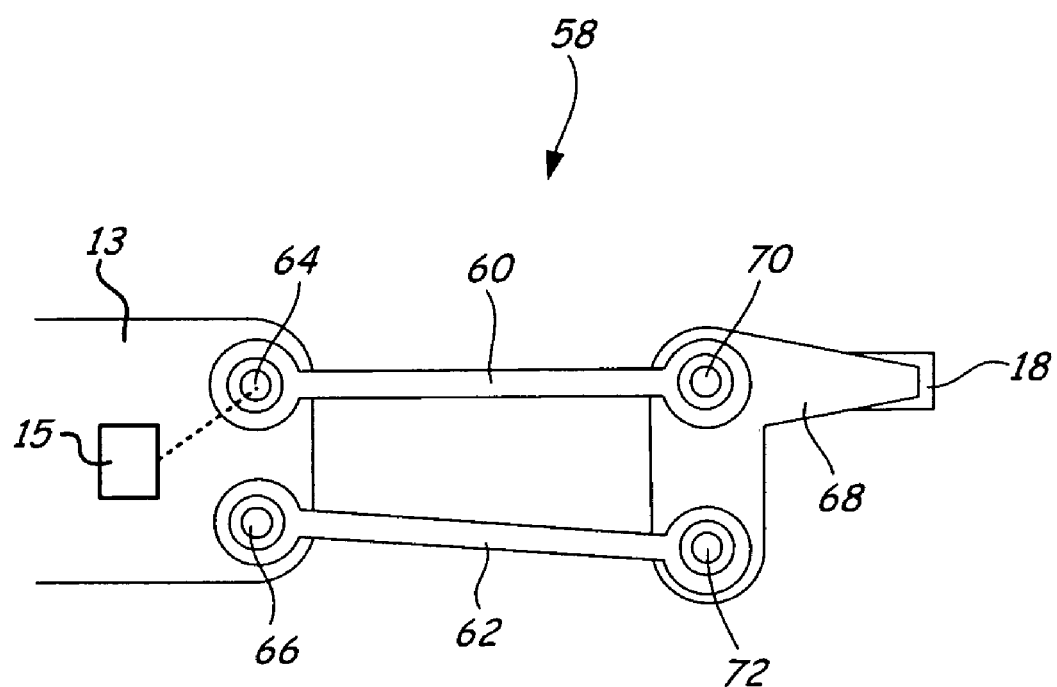
FIG. 5 is a top plan view of another embodiment of an actuator arm of the present invention.

FIG. 5 is a top plan view of another embodiment of an actuator arm of the present invention. Arm 58 has non-parallel links 60 and 62 of different lengths. While links 60 and 62 are not parallel, they are generally parallel. A first end of links 60 and 62 is pivotally connected to actuator block 13 at axes 64 and 66, respectivley. A second end of links 60 and 62 is pivotally connected to mounting block 68 at axes 70 and 72, respectively. Flexure 18 carries slider 20 with a transducer thereon, and is positioned on mounting block 68.

In one embodiment, a distance from axis 64 to axis 70 is 1 inch. The distance from axis 70 to a transducer carried on a slider mounted on flexure 18 is 0.5 inch. The distance between axis 64 and axis 66 is 0.31 inch. The distance between axis 70 and axis 72 is 0.38 inch.

Figure 6:
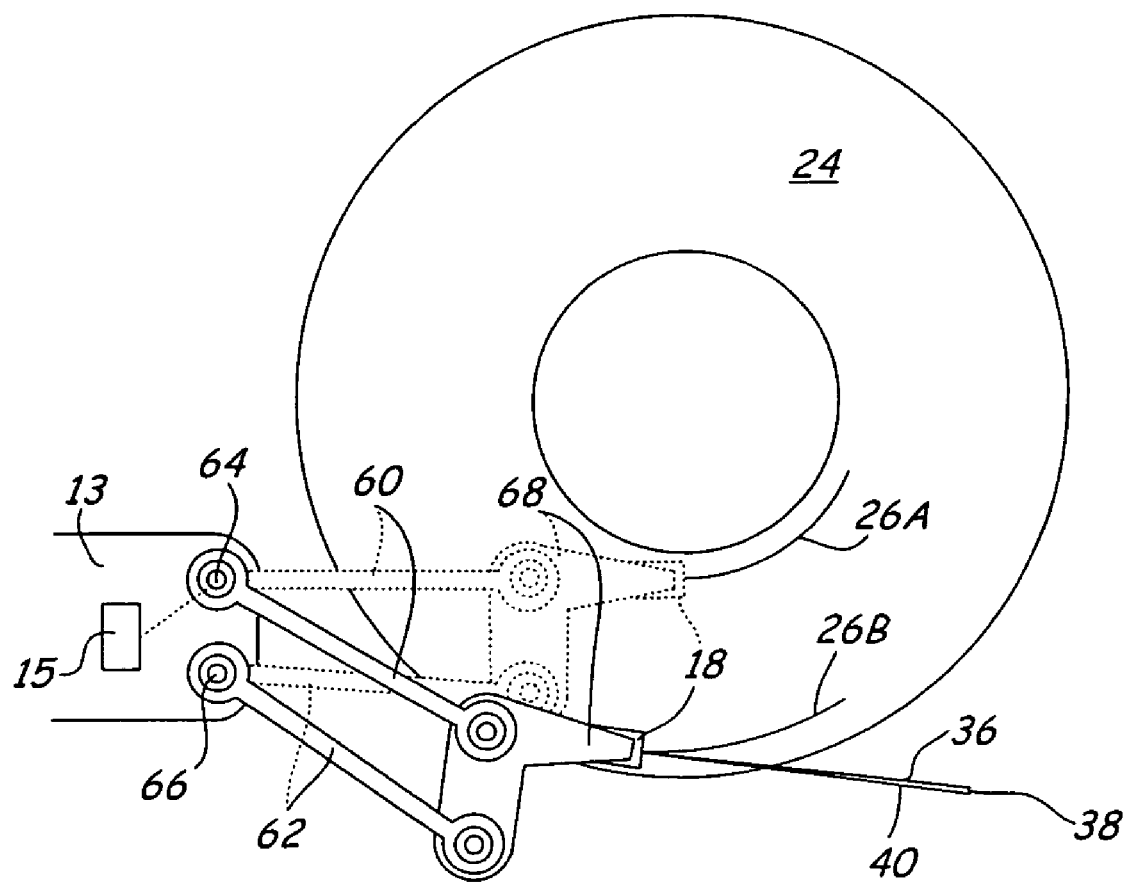
FIG. 6 is a top plan view illustrating the skew of the arm of FIG. 5 as it sweeps across the disc.

FIG. 6 is a top plan view illustrating the skew of the arm of FIG. 5 as it sweeps across disc 24. Across a sweep of disc 24, arm 58 of FIG. 5 exhibits a maximum skew variation 38 of about 0.9 degrees. It should be noted that the maximum skew variation does not necessarily occur at outer track 26b (as it is shown for purposes of illustration). Rather, the skew variation across the sweep of the disc from inner track 26a to outer track 26b follows a non-linear curve with a maximum somewhere along the curve of about 0.9 degrees. The functional relationship between skew and sweep displacement can be determined by the above-mentioned computer programs. It is noted that the variation can be positive or negative (i.e., on either side of the track tangent). Thus, the present invention can meet the demands of high-density disc drives by reducing skew variation to less than about 2 degrees from a tangent of a disc track.

In each of the previously discussed embodiments, each link is preferably a stiff member connected at one end to actuator block 13 and at the other end to a slider mounting block by pivotally movable joints. In one embodiment, the joint at each pivot axis consists of a standard pin or ball bearing joint. However, a drawback of such joints is that they can create friction and wear, leading eventually to the presence of contaminating particles in the sealed disc environment. Moreover, ball bearing joints can be undesirably expensive and heavy. Additionally, the rolling motion of the balls in the bearings can produce undesirable mechanical noise. Therefore, it is contemplated that alternate flexible members can be used in the place of ball bearings at each pivot axis.

Figure 7A:
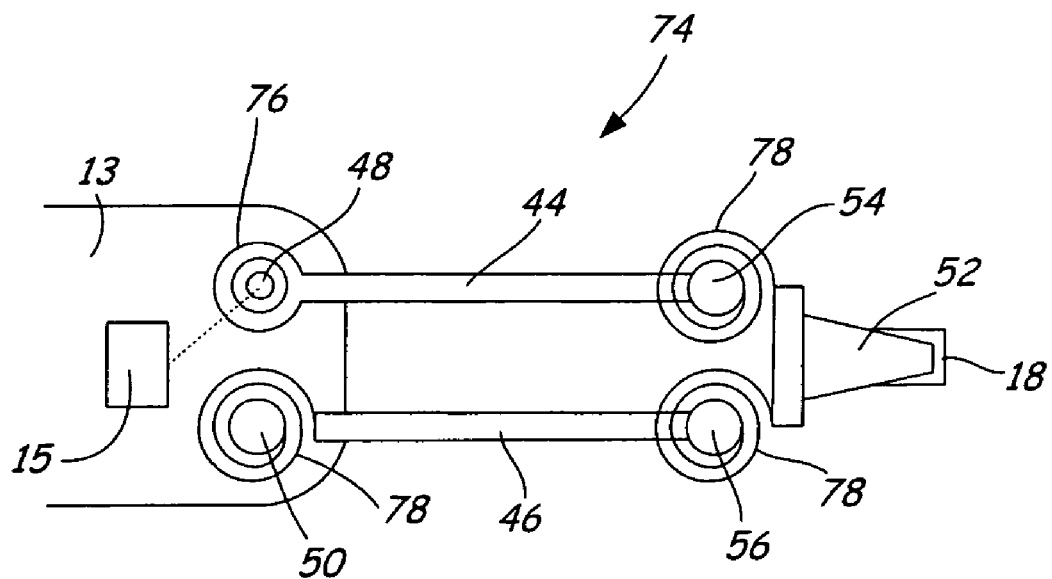
FIG. 7A is a top plan view of another embodiment of an actuator arm of the present invention.

FIG. 7A is a top plan view of another embodiment of an actuator arm of the present invention. Arm 74 is similar to arm 42 of FIG. 3, except that only axis 48 uses ball bearing 76 for the movable joint. Torsion springs 78 are used at axes 50, 54 and 56. In the illustrated embodiment, one ball bearing 76 is used at the actuator axis 48 controlled by actuator motor 15 to provide pivotal motion that is adequately constrained in the non-pivoting directions. Because of the configuration of the links and pivot axes, rotational input from actuator motor 15 at just one pivot point 48 controls the orientation of each link 44 and 46 and mounting block 52. With the use of torsion springs 78 at axes 50, 54 and 56, no rubbing occurs between components moving at those joints, so no material debris is generated. In a preferred design, the joint at actuator axis 48 is a ball bearing 76; however, use of other flexible joint designs in alternative embodiments is also contemplated.

Figure 7B:
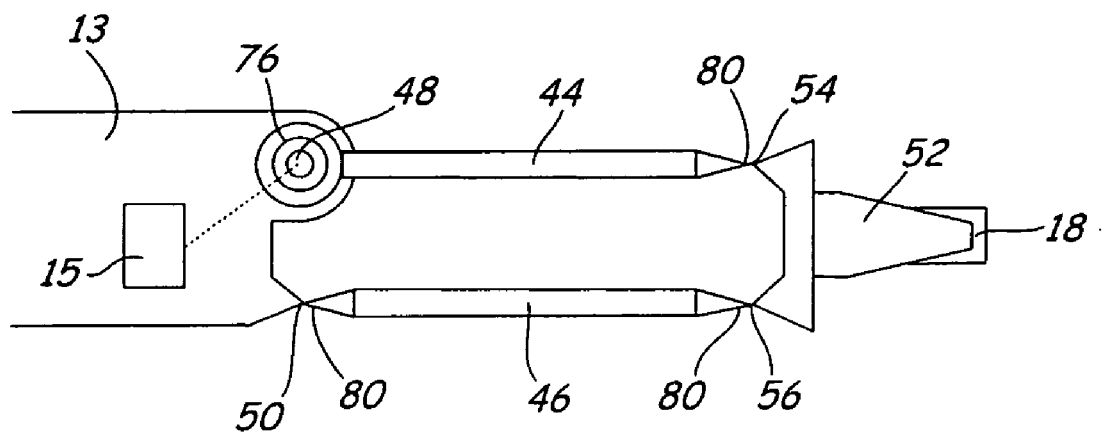
FIG. 7B is a top plan view of another embodiment of an actuator arm of the present invention.

FIG. 7B is a top plan view of another embodiment of an actuator arm of the present invention. In this embodiment, flexible hinges 80 provide the movable joints at axes 50, 54 and 56. Hinges 80 preferably have a bending joint consisting simply of a thin piece of flexible material such as plastic or metal. With proper design and material selection, fatigue failures at axes 50, 54 and 56 of hinges 80 can be eliminated.

Figure 8A:
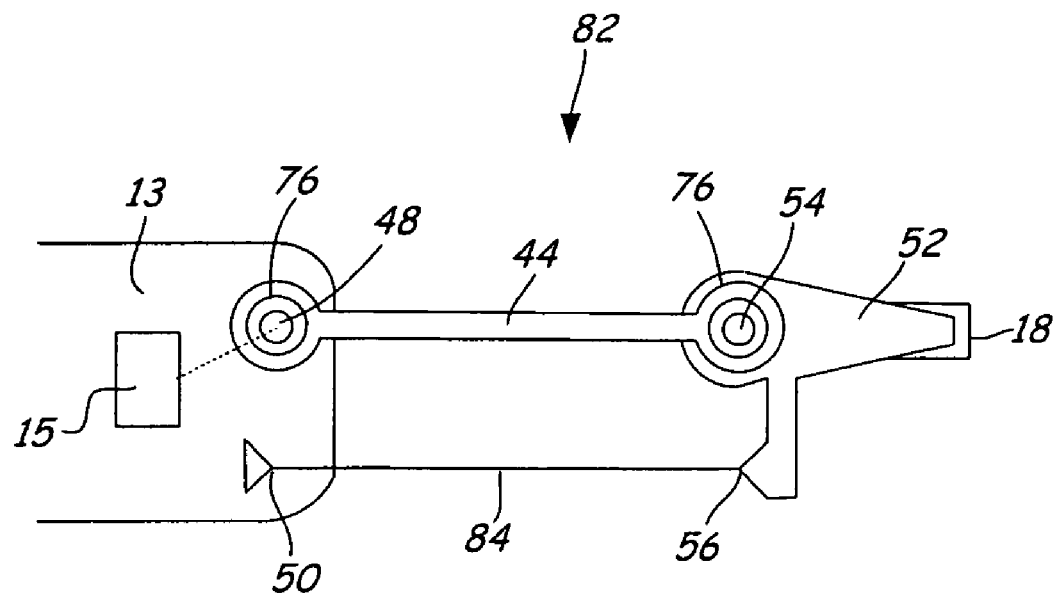
FIG. 8A is a top plan view of an embodiment of the present invention using a spring guided linkage.
Figure 8B:
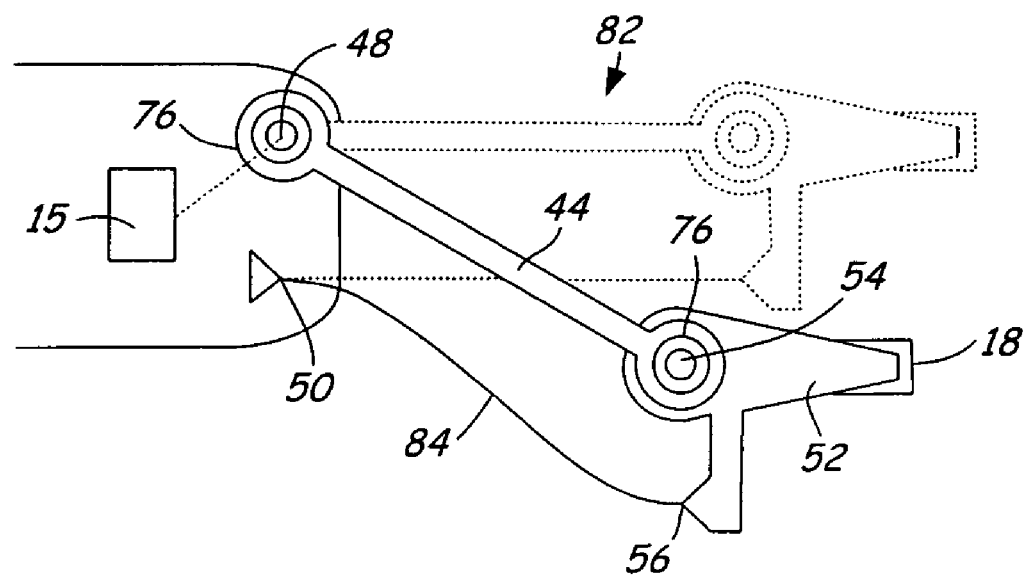
FIG. 8B is a top plan view of the actuator arm of FIG. 8A after displacement.

FIG. 8A is a top plan view of an embodiment of the present invention using a spring guided linkage. FIG. 8B is a top plan view of the actuator arm of FIG. 8A after displacement. In a preferred embodiment, a drive link is generally a rigid link member. A guide link can be rigid or flexible. In arm 82, link 44 is attached by ball bearing 76 at axes 48 and 54. The movement of link 44 is constrained by flexible link or spring 84, which is fixed to actuator block 13 at axis 50 and mounting block 52 at axis 56. In one embodiment, spring 84 is fixedly, rather than pivotally, connected at axes 50 and 56; the motion of spring 84 is provided by the spring's flexibility rather than by movable joints at axes 50 and 56. Spring 84 is sufficiently flexible to allow movement of link 44 as actuator motor 15 moves link 44 about axis 48 to the position illustrated in FIG. 8B. Spring 84 is also sufficiently rigid to maintain mounting block 52 and flexure 18 in the original orientation relative to the disc and not allow excess pivoting motion about axis 54. In one embodiment, spring 84 is a leaf spring in the form of a flexible, flat piece of metal. The dimensions and configuration of arm 82 can be varied for different rigidities of spring 84.

Figure 9:
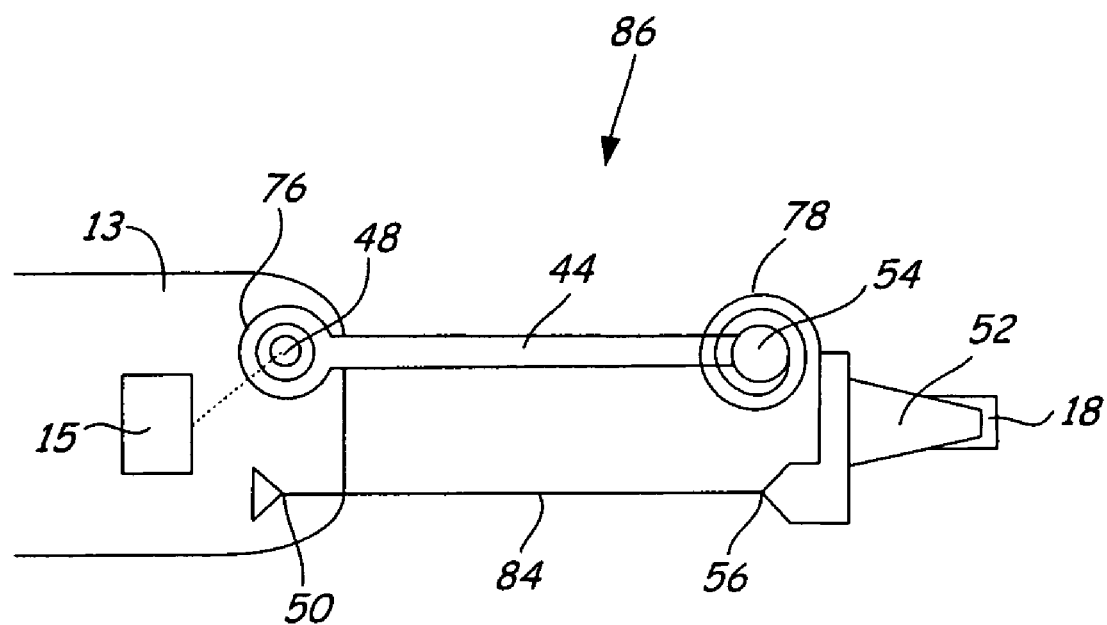
FIG. 9 is a top plan view of another embodiment of the actuator arm of the present invention.

FIG. 9 is a top plan view of another embodiment of the actuator arm of the present invention. Any combination of links, springs, and movable joints can be used. For example, in arm 86, link 44 is connected to actuator block 13 at axis 48 with ball bearing 76. Link 44 is connected at axis 54 with torsion spring 78. The movement of link 44 is constrained by spring 84, connected at its ends to axes 50 and 56. It is contemplated that in an alternative embodiment, torsion spring 78 and guide spring 84 can comprise one continuous spring member. Thus, the linkage arm of the present invention can be constructed in numerous ways to constrain the path and orientation of a transducer carried on flexure 18 to reduce or eliminate skew as the transducer is swept across the surface of a disc.

While the principles of this invention have been described in connection with specific embodiments, it should be understood clearly that these descriptions are made only by way of example and are not intended to limit the scope of the invention. Workers skilled in the art will recognize that changes may be made in form and detail without departing from the spirit and scope of the invention.

The invention claimed is:

1. A rotary actuator system comprising:
    an actuator block;
    a mounting block including a mounting arm having a distal end connected to a transducer; and
    a linkage arm comprising:
        a drive link having a first end and a second end, the drive link being pivotally connected to the actuator block at the first end and pivotally connected to the mounting block at the second end; and
        a guide link spaced apart from the drive link, the guide link having a first end and a second end, the guide link being pivotally connected to the actuator block at the first end and pivotally connected to the mounting block at the second end, wherein the mounting arm extends in a direction generally perpendicular to a line passing through the second end of the drive link and the second end of the guide link.

2. The rotary actuator system of claim 1 in which the drive link is a rigid link.

3. The rotary actuator system of claim 1 in which the guide link is a rigid link.

4. The rotary actuator system of claim 1 in which the guide link is a flexible link.

5. The rotary actuator system of claim 1 in which the drive link and the guide link move in a common plane.

6. The rotary actuator system of claim 1 in which a length of the drive link is equal to a length of the guide link.

7. The rotary actuator system of claim 1 in which a length of the drive link is different from a length of the guide link.

8. The rotary actuator system of claim 1 further comprising a ball bearing joint at a pivotal connection between the first end of the drive link and the actuator block.

9. The rotary actuator system of claim 8 further comprising:
    a ball bearing joint at a connection between the second end of the drive link and the mounting block;
    a ball bearing joint at a connection between the first end of the guide link and the actuator block; and
    a ball bearing joint at a connection between the second end of the guide link and the mounting block.

10. The rotary actuator system of claim 8 further comprising:
    a torsion spring at a connection between the second end of the drive link and the mounting block;
    a torsion spring at a connection between the first end of the guide link and the actuator block; and
    a torsion spring at a connection between the second end of the guide link and the mounting block.

11. The rotary actuator system of claim 8 further comprising:
    a hinge at a connection between the second end of the drive link and the mounting block;
    a hinge at a connection between the first end of the guide link and the actuator block; and
    a hinge at a connection between the second end of the guide link and the mounting block.

12. A rotary actuator system comprising:
    an actuator block;
    a mounting block including a mounting arm having a distal end connected to a transducer;
    a linkage arm comprising a plurality of generally parallel links, each link having a first end and a second end, each link pivotally connected to the actuator block at the first end and pivotally connected to the mounting block at the second end, wherein the mounting arm extends in a direction generally perpendicular to a line passing through the second ends of at least two of the generally parallel links; and
    an actuator motor, operatively connected to one of the plurality of generally parallel links for rotating the one of the plurality of generally parallel links at the first end, the rotation relative to the actuator block.

13. The rotary actuator system of claim 12 in which the plurality of generally parallel links comprises two links of the same length.

14. The rotary actuator system of claim 12 in which the plurality of generally parallel links comprises two links of different length.

15. The rotary actuator system of claim 12 further comprising a ball bearing joint at each of the pivotal connections between the first ends of each link and the actuator block and the second ends of each link and the mounting block.

16. The rotary actuator system of claim 12 in which the plurality of generally parallel links comprises a first link and a second link, the system further comprising a ball bearing joint at the pivotal connection between the first end of the first link and the actuator block.

17. The rotary actuator system of claim 16 further comprising:
    a torsion spring at the pivotal connection between the second end of the first link and the mounting block;
    a torsion spring at the pivotal connection between the first end of the second link and the actuator block; and
    a torsion spring at the pivotal connection between the second end of the second link and the mounting block.

18. The rotary actuator system of claim 16 further comprising:
- a hinge at the pivotal connection between the second end of the first link and the mounting block;
- a hinge at the pivotal connection between the first end of the second link and the actuator block; and
- a hinge at the pivotal connection between the second end of the second link and the mounting block.

19. A rotary actuator system comprising:
- an actuator block;
- a mounting block; and
- a linkage arm comprising:
  - a first link, having a first end and a second end, the first end being pivotally connected to the actuator block, and the second end being pivotally connected to the mounting block; and
  - a second link being generally parallel to the first link, the second link being a spring, the second link having a first end and a second end, the first end being connected to the actuator block, and the second end being connected to the mounting block.

20. The rotary actuator system of claim 19 further comprising:
- a ball bearing joint at the pivotal connection between the first end of the first link and the actuator block.

21. A rotary actuator system comprising:
- an actuator block;
- a mounting block; and
- a linkage arm comprising:
  - a drive link having a first end and a second end, the drive link being pivotally connected to the actuator block at the first end and pivotally connected to the mounting block at the second end; and
  - a guide link spaced apart from the drive link, the guide link having a first end and a second end, the guide link being pivotally connected to the actuator block at the first end and pivotally connected to the mounting block at the second end, wherein a length of the drive link is different from a length of the guide link.

22. A rotary actuator system comprising:
- an actuator block;
- a mounting block;
- a linkage arm comprising:
  - a drive link having a first end and a second end, the drive link being pivotally connected to the actuator block at the first end and pivotally connected to the mounting block at the second end; and
  - a guide link spaced apart from the drive link, the guide link having a first end and a second end, the guide link being pivotally connected to the actuator block at the first end and pivotally connected to the mounting block at the second end;
- a ball bearing joint at a pivotal connection between the first end of the drive link and the actuator block;
- a torsion spring at a connection between the second end of the drive link and the mounting block;
- a torsion spring at a connection between the first end of the guide link and the actuator block; and
- a torsion spring at a connection between the second end of the guide link and the mounting block.

23. A rotary actuator system comprising:
- an actuator block;
- a mounting block;
- a linkage arm comprising a plurality of generally parallel links, each link having a first end and a second end, each link pivotally connected to the actuator block at the first end and pivotally connected to the mounting block at the second end, wherein the plurality of generally parallel links comprises two links of different length; and
- an actuator motor, operatively connected to one of the plurality of generally parallel links for rotating the one of the plurality of generally parallel links at the first end, the rotation relative to the actuator block.

24. A rotary actuator system comprising:
- an actuator block;
- a mounting block;
- a linkage arm comprising a plurality of generally parallel links, each link having a first end and a second end, each link pivotally connected to the actuator block at the first end and pivotally connected to the mounting block at the second end, wherein the plurality of generally parallel links comprises a first link and a second link, the system further comprising a ball bearing joint at the pivotal connection between the first end of the first link and the actuator block;
- an actuator motor, operatively connected to one of the plurality of generally parallel links for rotating the one of the plurality of generally parallel links at the first end, the rotation relative to the actuator block;
- a torsion spring at the pivotal connection between the second end of the first link and the mounting block;
- a torsion spring at the pivotal connection between the first end of the second link and the actuator block; and
- a torsion spring at the pivotal connection between the second end of the second link and the mounting block.

* * * * *